Figure 1:
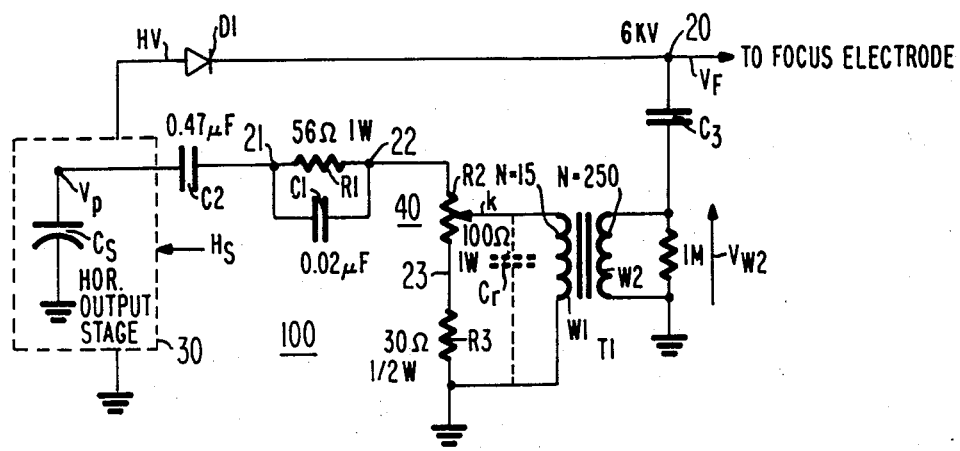

United States Patent [19]

Truskalo

[11] Patent Number: 4,707,639
[45] Date of Patent: Nov. 17, 1987

[54] DYNAMIC FOCUS VOLTAGE WITH PHASE COMPENSATED ADJUSTMENT

[75] Inventor: Walter Truskalo, Titusville, N.J.
[73] Assignee: RCA Corporation, Princeton, N.J.
[21] Appl. No.: 900,531
[22] Filed: Aug. 26, 1986
[51] Int. Cl.[4] .................. H01J 29/58; H01J 29/70; H04N 5/228
[52] U.S. Cl. .................. 315/382; 315/411; 358/218
[58] Field of Search .............. 315/382, 382.1, 411; 358/218

[56] References Cited

U.S. PATENT DOCUMENTS 4,587,465 5/1986 Truskalo ..................... 315/382

FOREIGN PATENT DOCUMENTS 0155721 12/1979 Japan ..................... 315/382.1

OTHER PUBLICATIONS

An operating manual of VR-series display monitors of Moniterm Corporation, Eden Praire, Minnesota.

Primary Examiner—Theodore M. Blum
Assistant Examiner—Gregory C. Issing
Attorney, Agent, or Firm—Eugene M. Whitacre; Joseph J. Laks; Sammy S. Henig

[57] ABSTRACT

An attenuator couples a parabolic voltage developed in a trace capacitance, to a focus electrode. The attenuator includes a phase compensation network that causes the phase of the parabolic voltage that is coupled to the focus electrode to be substantially the same relative to that of the parabolic voltage in the trace capacitor for any scan frequency that is selected from a range of frequencies.

11 Claims, 2 Drawing Figures

DYNAMIC FOCUS VOLTAGE WITH PHASE COMPENSATED ADJUSTMENT

This invention relates to a television apparatus that generates modulated voltage coupled to a control electrode of a cathode ray tube (CRT), such as a focus electrode or to an electrode that corrects astigmatism, for controlling the size of the beam spot on the CRT screen.

The need for electron beams control voltage such as, for example, focus voltage control is well understood in the art. It was experienced early in television apparatus as an incident to the scanning of a CRT because the distance from the center of deflection to the scanned raster is not uniform. Actually, that distance varies markedly as the beam is deflected horizontally and vertically from the central portion of the screen and, consequently, defocusing is most severe at the corners of the raster. The adoption of picture tubes of increased size and wider deflection angles in recent years has emphasized the defocusing effect at the corners of the scanning pattern.

Efforts have been made to control a focus or an astigmatizm error in electrostatically controlled tubes by changing the magnitude of the potential of the corresponding electrode of the CRT with displacement of the beam from the center of the raster. When this technique is used for controlling, for example, the focus electrode, it is referred to as dynamic focusing. It comprises the application of unidirectional potential to the focus electrode of the electrostatically focused cathode-ray tube to establish the proper focus condition at the center of the raster and the concurrent application of a suitably varying potential to preserve that condition throughout the scanning raster. Since, in the usual case, the beam focus changes approximately in accordance with a parabolic function along either scanning direction, the varying components of focus potential may include parabolic waveforms in both axes. The parabolic waveform in, for example, the horizontal direction is summed with a high potential DC voltage to produce the dynamic focus voltage.

In some prior art television systems, a parabolically shaped signal, repeating at the horizontal scan rate, is produced across a trace capacitor coupled in series with the deflection winding for providing S-shaping. In general, however, the parabolically shaped voltage across the trace, or S-shaping capacitor is not suitable for direct application to the focus electrode. For example, its amplitude may be too small and its polarity may be opposite to that generally required. Some conventional television circuits use a step-up transformer to couple the voltage across the S-shaping capacitor to the focus electrode. In such arrangement, a primary winding of the transformer is coupled across the S-shaping capacitor and a secondary winding is coupled to a summing junction where a high potential DC voltage is combined with the horizontal rate parabolic voltage to produce the dynamic focus voltage.

When the primary winding is connected directly across the S-shaping capacitor the phase of the parabolic voltage at the secondary winding may be equal to that across the S-shaping capacitor and may be the correct phase that is required for obtaining focusing.

In some television monitor applications, the amplitude of the parabolic voltage across the primary winding of the transformer has to be adjustable in order to adjust the amplitude of the parabolic waveform focus voltage. The need for such adjustment may arise when the monitor is required to operate at any one scan frequency selected from a plurality of scan frequencies. It is well known that when the scan frequency is, for example, increased, the amplitude of the parabolic voltage across the S-shaping, or trace capacitor has to be proportionally increased to obtain proper S-correction. On the other hand, it may not be desirable that the amplitude of the parabolic waveform of the focus voltage be affected by the change in the amplitude of the parabolic voltage across the trace capacitor. Therefore, when the scan frequency is increased, it may be desirable to attenuate the amplitude of the voltage across the primary winding of the step-up transformer so as to maintain constant the amplitude of the focus voltage.

In one prior art monitor circuit, a variable resistor is coupled in series with the primary winding of the step-up transformer. The variable resistor acts as an adjustable attenuator that controls the amplitude of the parabolic voltage across the primary winding of the transformer. The focus electrode capacitive impedance is reflected back to the primary winding of the transformer. The variable resistor and the reflected capacitance, disadvantageously, may introduce an undesirable delay, or phase shift, of the parabolic voltage across the primary winding relative to the phase of the parabolic voltage across the S-shaping capacitor. The phase delay may undesirably, be different for different scan rates or for different adjustments of the variable resistor. Furthermore, disadvantageously, changing the value of the variable resistor may cause an undesirable effect on the shape of the parabolic waveform across the S-shaping capacitance that may introduce a scan distortion.

Therefore, it may be desirable to couple the primary winding to the trace capacitor via an adjustable attenuator in such a way that the phase of the parabolic voltage across the primary winding will not be substantially affected when the frequency changes, or after the attenuator is adjusted. Moreover, it may be desirable that the parabolic voltage across the trace capacitor will not be substantially affected after the adjustable attenuator is adjusted.

In accordance with an aspect of the invention, a winding of a focus transformer is coupled to a trace capacitance of deflection circuit output stage via an attenuator, embodying the invention, for controlling the amplitude of a parabolic voltage across the transformer winding. The attenuator includes a network that provides a phase lead that compensates for a phase lag caused by a capacitance that is reflected from the focus electrode.

In accordance with another aspect of the invention, a variable resistor of the attenuator is adjusted to provide substantially the same amplitude of the parabolic voltage across a winding of the transformer at each corresponding scan frequency.

In accordance with yet another aspect of the invention, adjustment of the attenuator for the corresponding scan frequency causes the phase of the parabolic voltage across the winding relative to that of the parabolic voltage across the trace capacitor to be substantially unchanged.

Figure 2:
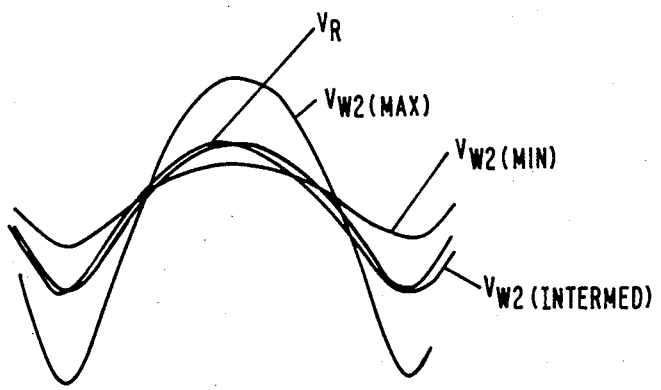

FIG. 1 illustrates a focus voltage generating circuit, embodying the invention; and FIG. 2 illustrates waveforms useful in explaining the circuit of FIG. 1.

FIG. 1 illustrates a focus voltage generating circuit 100 embodying the invention. A high amplitude deflection rate votlage HV is coupled via a rectifying diode D1 to a summing junction 20 for developing a high potential DC voltage component of a focus voltage $V_F$. Voltage HV is generated in a conventional manner by a deflection circuit output stage 30 operating at a deflection rate $f_H$.

A horizontal rate parabolic voltage $V_p$ is developed in output stage 30 in a conventional manner across a trace capacitor $C_s$ having a plate that is coupled to ground. Voltage $V_p$ is developed as a result of a horizontal rate sawtooth current $i_y$ that also flows in a deflection winding $L_y$, not shown in the Figures. Sawtooth current $i_y$ is generated in a conventional manner by conventionally built horizontal output stage 30 that is controlled by a horizontal sync signal $H_s$.

Voltage $V_p$ is coupled to an adjustable attenuator 40, embodying an aspect of the invention, via a DC-blocking coupling capacitor C2 that has a low impedance at the scan frequency $f_H$. Attenuator 40 includes a parallel arrangement of capacitor C1 and a resistor R1 that are each coupled to a terminal 21, at the plate of capacitor C2 that is remote from capacitor $C_s$. A junction terminal 22 to which the other ends of capacitor C1 and resistor R1 are respectively coupled, is coupled to one end terminal of a potentiometer, or variable resistor R2 of attenuator 40 having a second end terminal 23 that is coupled to ground via a series coupled current limiting resistor R3.

In accordance with an inventive feature, capacitor C1 and resistor R1 provide a phase lead to the parabolic voltage that is coupled to terminal 22. A primary winding W1 of a focus transformer T1 is coupled between a wiper k of variable resistor R2 and ground. When wiper k is situated closer to a junction terminal 23, that is between resistors R3 and R2, the amplitude of the parabolic voltage across winding W1 is smaller than when wiper k is situated closer to junction terminal 22.

A secondary winding W2 of transformer T1 has a first terminal that is at the ground potential and a second terminal that is coupled via a DC blocking capacitor C3 to the focus electrode to form dynamic focus voltage $V_F$.

The focus electrode capacitance, as well as any other associated stray capacitance, is reflected back to winding W1 as a reflected capacitance $C_r$, illustrated in dashed line in FIG. 1.

One prior art circuit includes a variable resistor coupled in series with a focus transformer. In such prior art circuit, the reflected capacitance, such as capacitance $C_r$ of FIG. 1, forms with the variable resistor an R-C network having an adjustable resistor. The R-C network, disadvantageously, causes a phase lag that varies with the scan frequency and with the adjustment of the variable resistor.

In the circuit of FIG. 1, embodying an aspect of the invention, capacitance $C_r$ is coupled in parallel with a portion of resistor R2 that is between wiper k and terminal 23. Capacitor C1 that forms a differentiating network with resistor R1 compensates for a phase lag that, without such differentiating network, would be caused, by capacitance $C_r$, to focus voltage $V_F$.

In accordance with an aspect of the invention, capacitor C1 compensates for a variation of a phase lag to focus voltage $V_F$ that would have otherwise been caused by reflected capacitance $C_r$. In the circuit of FIG. 1, the phase shift caused by attenuator 40 and capacitor $C_r$ remains substantially constant and small at any scan frequency, for example, between 54 KHz and 80 KHz, that is selected.

In accordance with another aspect of the invention, the resistive part of the impedance that is coupled across capacitor $C_s$ and that is caused by resistors R1, R2 and R3 of attenuator 40 remains the same for any adjustment of attenuator 40. Therefore, advantageously, the resistive loading across capacitor $C_s$ is not affected by the scan frequency.

FIG. 2 illustrates the waveform of parabolic voltage $V_p$ across trace capacitor $C_s$ and that of a voltage $V_{W2}$ across winding W2 of FIG. 1 for three different positions of wiper k of variable resistor R2, respectively, when the scan frequency is 64 KHz. Voltage $V_{W2(max)}$ of FIG. 2 represents voltage $V_{W2}$ of FIG. 1 when wiper k is positioned closest to junction terminal 22. Voltage $V_{W2(min)}$ of FIG. 2 represents voltage $V_{W2}$ of FIG. 1 when wiper k is positioned furthest away from junction terminal 22. Voltage $V_{W2(intermed)}$ of FIG. 2 represents an intermediate position of wiper k of FIG. 1

Adjustment of attenuator 40 of FIG. 1 causes the phase shift, at the scan frequency $f_H$ that is equal to 64 KHz, of each of voltges $V_{W2(min)}$, $V_{W2(max)}$ and $V_{W2(intermed)}$ relative to voltage $V_p$ of FIG. 2 to be substantially small. Because the phase shift is small for different adjustments of resistor R2 at the 64 KHz scan frequency, it may be concluded that varying the scan frequency will have only a small effect on the phase shift.

What is claimed:

1. An apparatus for generating a parabolic control voltage coupled to an electrode of a cathode ray tube of a video display apparatus for controlling the electron beam in said cathode ray tube, comprising:

means coupled to a deflection circuit for generating a first parabolic voltage representative of a parabolic voltage in a trace capacitance;

an attenuator coupled between said first parabolic voltage and said electrode for attenuating said first parabolic voltage to form an attenuated parabolic voltage that is coupled to said electrode, said attenuator including a capacitive phase compensation network that enables said attenuator to attenuate said first parabolic voltage to an amplitude that is required by said electrode without producing a substantial phase shift of said parabolic control voltage relative to that of said parabolic voltage that is generated in said trace capacitance; and a transformer coupled between said first parabolic voltage and said electrode in a circuit path that includes said attenuator for magnetically coupling said first parabolic voltage to said electrode.

2. An apparatus according to claim 1 further comprising a DC blocking capacitor coupled between said trace capacitance and said transformer for coupling said first parabolic voltage to said transformer.

3. An apparatus according to claim 1 wherein said deflection circuit is capable of operating at any scan frequency that is selected from a plurality of scan frequencies and wherein said attenuator includes means for adjusting the amplitude of said parabolic control voltage to be at an amplitude that is required at any given scan frequency that is selected such that, at any said given scan frequency that is selected, the phase of said parabolic control voltage at said electrode is substantially the same relative to that of said parabolic voltage in said trace capacitance.

4. An apparatus according to claim 1 wherein a capacitive load is coupled to said electrode and wherein said capacitive phase compensation network includes a capacitance that causes a phase lead that compensates for a phase lag caused by said capacitive load.

5. An apparatus according to claim 4 wherein said parabolic control voltage is coupled to a focus electrode of a cathode ray tube to provide dynamic focus voltage.

6. An apparatus according to claim 1 wherein said attenuator comprises a resistive voltage dividing arrangement having an output terminal that is coupled to said electrode and wherein said phase compensation network comprises a first capacitance that is interposed between said trace capacitance and an input terminal of said resistive voltage dividing arrangement.

7. An apparatus according to claim 6 further comprising a resistance that is interposed between said trace capacitance and said input terminal of said resistive voltage dividing arrangement.

8. An apparatus according to claim 7 wherein said resistance that is interposed between said trace capacitance and said input terminal is coupled in parallel with said first capacitance.

9. An apparatus according to claim 1 wherein said attenuator comprises a resistive voltage dividing arrangement having an output terminal that is coupled to a capacitive load and wherein said capacitive phase compensation network comprises a differentiating network that compensates for a phase lag caused by said capacitive load.

10. An apparatus according to claim 9 wherein said voltage dividing arrangement comprises a potentiometer having a wiper that is coupled to said capacitance load.

11. An apparatus according to claim 1 wherein said deflection circuit is capable of operating at any one scan frequency selected from a plurality of scan frequencies that form a wide range of frequencies and wherein a resistive loading across said trace capacitance that is formed by an input impedance of said attenuator remains the same at any selected frequency.

* * * * *